United States Patent [19]

Tellier

[11] Patent Number: 4,899,178

[45] Date of Patent: Feb. 6, 1990

[54] THERMAL INK JET PRINTHEAD WITH INTERNALLY FED INK RESERVOIR

[75] Inventor: Thomas A. Tellier, Williamson, N.Y.

[73] Assignee: Xerox Corporation, Stamford, Conn.

[21] Appl. No.: 305,041

[22] Filed: Feb. 2, 1989

[51] Int. Cl.[4] .......................... G01D 15/16; B41J 3/04

[52] U.S. Cl. ................................ 346/140 R; 156/644; 156/647

[58] Field of Search ................. 346/140; 156/644, 647

[56] References Cited

U.S. PATENT DOCUMENTS

| | | | |
|---|---|---|---|
| Re. 32,572 | 1/1988 | Hawkins et al. | 156/626 |
| 4,638,337 | 1/1987 | Torpey et al. | 346/140 R |
| 4,774,530 | 9/1988 | Hawkins | 346/140 R |
| 4,786,357 | 11/1988 | Campanelli et al. | 156/633 |
| 4,829,324 | 5/1989 | Drake | 346/140 |

*Primary Examiner*—Joseph W. Hartary

*Attorney, Agent, or Firm*—Robert A. Chittum

[57] ABSTRACT

An improved thermal ink jet printhead and method of fabrication thereof is disclosed for the type formed by the mating and bonding of first and second substrates. The first substrate is silicon with {100} crystal plane surfaces and has anisotropically etched in one surface thereof a linear series of through recesses together with opposing outer shallow recesses and a plurality of parallel, elongated grooves. The second substrate has a plurality of heating elements and addressing electrodes patterned on one surface thereof. The through recesses with opposing outer shallow recesses serve as a segmented ink reservoir and the elongated grooves serve as ink channels. Adjacent recesses of the segmented reservoir are separated by the dividing walls. The spacing between vias having a dimension which will permit complete undercutting. The undercutting provides ink flow paths. In one embodiment, the shallow recesses of the segmented reservoir are internally fed through the undercut walls. The dividing walls strengthen the printhead and concurrently reduce the effects of angular misalignment between mask and first substrate crystal planes. The shallow internally fed segments of the reservoir reduce the number of through etched reservoir segments and permit the use of smaller gaskets to seal the interface between the printhead and an external ink supply.

5 Claims, 5 Drawing Sheets

THERMAL INK JET PRINTHEAD WITH INTERNALLY FED INK RESERVOIR

BACKGROUND OF THE INVENTION

1. Field of the Invention

This invention relates to the design and fabrication of ink jet printing devices, and more particularly to larger silicon thermal ink jet printheads having a portion of its ink reservoir internally fed from the remaining portions thereof. The printheads are fabricated by an anisotropic etching technique that reduces effects of angular misalignment of etchant resistant mask and circumvents the need for costly, elongated, difficult to use gaskets which seal the printhead to an external ink supply.

2. Description of the Prior Art

Thermal ink jet printing is a type of drop-on-demand ink jet system, wherein an ink jet printhead expels ink droplets on demand by the selective application of an electrical pulse to a thermal energy generator, usually a resistor, located in capillary-filled, parallel ink channels a predetermined distance upstream from the channel nozzles or orifices. The channel end opposite the nozzles are in communication with a small ink reservoir to which a larger external ink supply is connected.

U.S. Pat. No. Re. 32,572 to Hawkins et al discloses a thermal ink jet printhead and several fabricating processes therefor. Each printhead is composed of two parts aligned and bonded together. One part is a substantially flat substrate which contains on the surface thereof a linear array of heating elements and addressing electrodes, and the second part is a substrate having at least one recess anisotropically etched therein to serve as an ink supply manifold when the two parts are bonded together. A linear array of parallel grooves are also formed in the second part, so that one end of the grooves communicate with the manifold recess and the other ends are open for use as ink droplet expelling nozzles. Many printheads can be made simultaneously by producing a plurality of sets of heating element arrays with their addressing electrodes on a silicon wafer and by placing alignment marks thereon at predetermined locations. A corresponding plurality of sets of channel grooves and associated manifolds are produced in a second silicon wafer. In one embodiment, alignment openings are etched in the second silicon wafer at predetermined locations. The two wafers are aligned via the alignment openings and alignment marks, then bonded together and diced into many separate printheads.

U.S. Pat. No. 4,638,337 to Torpey et al discloses an improved thermal ink jet printhead similar to that of Hawkins et al, but has each of its heating elements located in a recess. The recess walls containing the heating elements prevent the lateral movement of the bubbles through the nozzle and therefore the sudden release of vaporized ink to the atmosphere, known as blow-out, which causes ingestion of air and interrupts the printhead operation whenever this event occurs. In this patent a thick film organic structure such as Riston® or Vacrel® is interposed between the heater plate and the channel plate. The purpose of this layer is to have recesses formed therein directly above the heating elements to contain the bubble which is formed over the heating elements, thus enabling an increase in the droplet velocity without the occurrence of vapor blow-out and concomitant air ingestion.

U.S. Pat. No. 4,774,530 to Hawkins discloses the use of an etched thick film insulative layer to provide the flow path between the ink channels and the manifold, thereby eliminating the fabrication steps required to open the channel groove closed ends to the manifold recess, so that the printhead fabrication process is simplified.

U.S. Pat. No. 4,786,357 to Campanelli et al, discloses the use of an etched thick film insulative layer between mated and bonded substrates. One substrate has a plurality of heating element arrays and addressing electrodes formed on the surface thereof and the other being a silicon wafer having a plurality of etched manifolds, with each manifold having a set of ink channels. The etched thick film layer provides a clearance space above each set of contact pads of the addressing electrodes to enable the removal of the unwanted silicon material of the wafer by dicing without the need for etched recesses therein. The individual printheads are produced subsequently by dicing the substrate having the heating element arrays.

As disclosed in the above-discussed patents, thermal ink jet printheads are basically fabricated from two substrates. One substrate contains the heating elements and the other contains ink recesses. When these two substrates are aligned and bonded together, the recesses serve as ink passageways. A plurality of each substrate is formed on separate wafers, so that the wafers may be aligned, mated, and diced into many individual printheads. The wafer for the plurality of sets of recesses is silicon and the recesses are formed by an anisotropic etching process. The anisotropic or orientation dependent etching has been shown to be a high yielding fabrication process for precise, miniature printheads. Such printheads are low cost, high resolution, electronically addressable printers with high reliability. They are usually about a quarter of inch wide and print small swaths of information while being translated across a stationary recording medium such as paper. The paper is then stepped the distance of one swath and the printing process continued until the entire page of paper is printed. This is a low speed process.

In efforts to increase the printing speed, larger arrays of nozzles are required. Each ink droplet emitting nozzle requires an ink channel which is in communication with an ink reservoir or manifold. In order to complete the etching from only one side of the wafer, the reservoirs are etched through the wafer so that the open bottoms may serve as ink inlets. As the array size increases, so also does the reservoir and thus the ink inlet. As the area of the through etch for the reservoirs increase, the wafer strength diminishes and yield drops because many of the fragile wafers are damaged during subsequent assembly operations.

There is another problem associated with long troughs or recesses. If the sides of the vias formed in the etch resistant masks are not perfectly aligned with the {111} crystal planes of the (100) silicon wafers or substrates, the resulting etched recesses will undercut the mask via and follow the {111} crystal planes nevertheless. Thus, any angular misalignment of the mask relative to the {111} crystal planes of the wafer will result in a rectangular etch recess having longer and wider dimensions than desired. This undercutting gets more severe as the desired recess or through slot length increases. Since the undercutting is a variable, depending on the pattern-crystal plane misorientation of a particular wafer, it cannot be easily compensated for in the mask design.

The open bottom or ink inlet of the reservoir is nearly the same dimension as the width of array of nozzles and associated ink channels. While this design has been satisfactory for smaller printhead arrays, large array (e.g., 200 nozzles) additionally require a gasket that is to seal the inlet to an external ink supply to be extremely long, resulting in specially designed gaskets which are costly and difficult to use.

SUMMARY OF THE INVENTION

It is an object of the present invention to minimize the fragility problem and misorientation induced undercut problem associated with larger printheads while concurrently reducing the size of the ink inlet by replacing some of the combined reservoirs and ink inlets with reservoirs that are internally fed.

In the present invention, an improved thermal ink jet printhead and method of fabrication thereof is disclosed of the type formed by the mating and bonding of first and second substrates. The first substrate is silicon with {100} crystal plane surfaces and has, anisotropically etched in one surface thereof, a linear series of adjacent, through recesses with opposing outer, smaller recesses that have V-groove cross-sections, and a plurality of parallel, elongated ink channels grooves. The second substrate has a plurality of heating elements and addressing electrodes patterned on one surface thereof. The plurality of linearly adjacent through recesses with opposing outer V-groove recesses in the first substrate serves as a segmented ink reservoir with each through recess having an open bottom that serves as an ink inlet. The elongated ink channel grooves have one end closed. The closed ends are adjacent the segmented ink reservoir while the opposite ends are open and serve as ink droplet emitting nozzles. Each heating element is located in a respective one of the ink channel grooves a predetermined distance upstream from the nozzles. Means are provided to place the ink channel grooves into communication with the through recess, so that selective application of electrical pulses representing digitized data to the heating elements eject and propel ink droplets from the nozzles to a recording medium. The improvement comprises providing a segmented reservoir in which each segment of the reservoir is isolated from each other by dividing walls. The segmented reservoir has opposing outer V-grooves on the ends of a linear plurality of through etched recesses and is produced by anisotropically etching a silicon substrate containing an etch resistant mask with vias patterned therein. The vias in the etch resistant mask for the outer V-grooves are, of course, smaller than those for the through etched recesses. Adjacent through and V-groove recesses are separated by the dividing walls, each having opposing wall surfaces that are in separate, adjacent segments of the segmented reservoir. The dividing walls strengthen the printhead when the number of nozzles and, thus the length of the reservoir, are increased. Concurrently, the effects of angular misalignment between mask and first substrate crystal planes are reduced. In one embodiment, the spacings between the vias of the etch resistant mask are determined to be that dimension which will enable complete undercutting prior to termination of the anisotropic through etching of the silicon wafer, so that there is not only a cross flow of ink between the separate through recesses, but also an internal flow of ink into the outer V-groove shaped portions of the segmented reservoir.

In another embodiment, the means for providing communication between the ink channel grooves and the segmented reservoir is accomplished by sandwiching a thick film insulative layer between the first and second substrates. The thick film layer is patterned and etched to form recesses therein which provide ink flow path between the segmented reservoir and the ink channel grooves and which provide ink flow passages from the through recess to the outer V-groove portions of the segmented reservoir.

A more complete understanding of the present invention can be obtained by considering the following detailed description in conjunction with the accompanying drawings, wherein the like index numerals indicate like parts.

DESCRIPTION OF THE PREFERRED EMBODIMENT

When the arrays of ink channels are enlarged to increase the width of printed swaths of information and thus increase the printing speed, the reservoir which supplies ink to the channels is also lengthened. The loss of this much silicon throughout the wafer causes a dramatic loss of wafer strength and results in a very fragile channel plate wafer. As discussed above, any angular misorientation of the mask vias with the {111} crystal planes of the wafer causes undercutting which gets more severe as the reservoir length increases. This invention relates to an ink jet printhead that overcomes those two problems with larger array printheads and further enables the reduction in the size of the gasket that seals the printhead with an external ink supply, discussed more fully later.

Figure 1A:
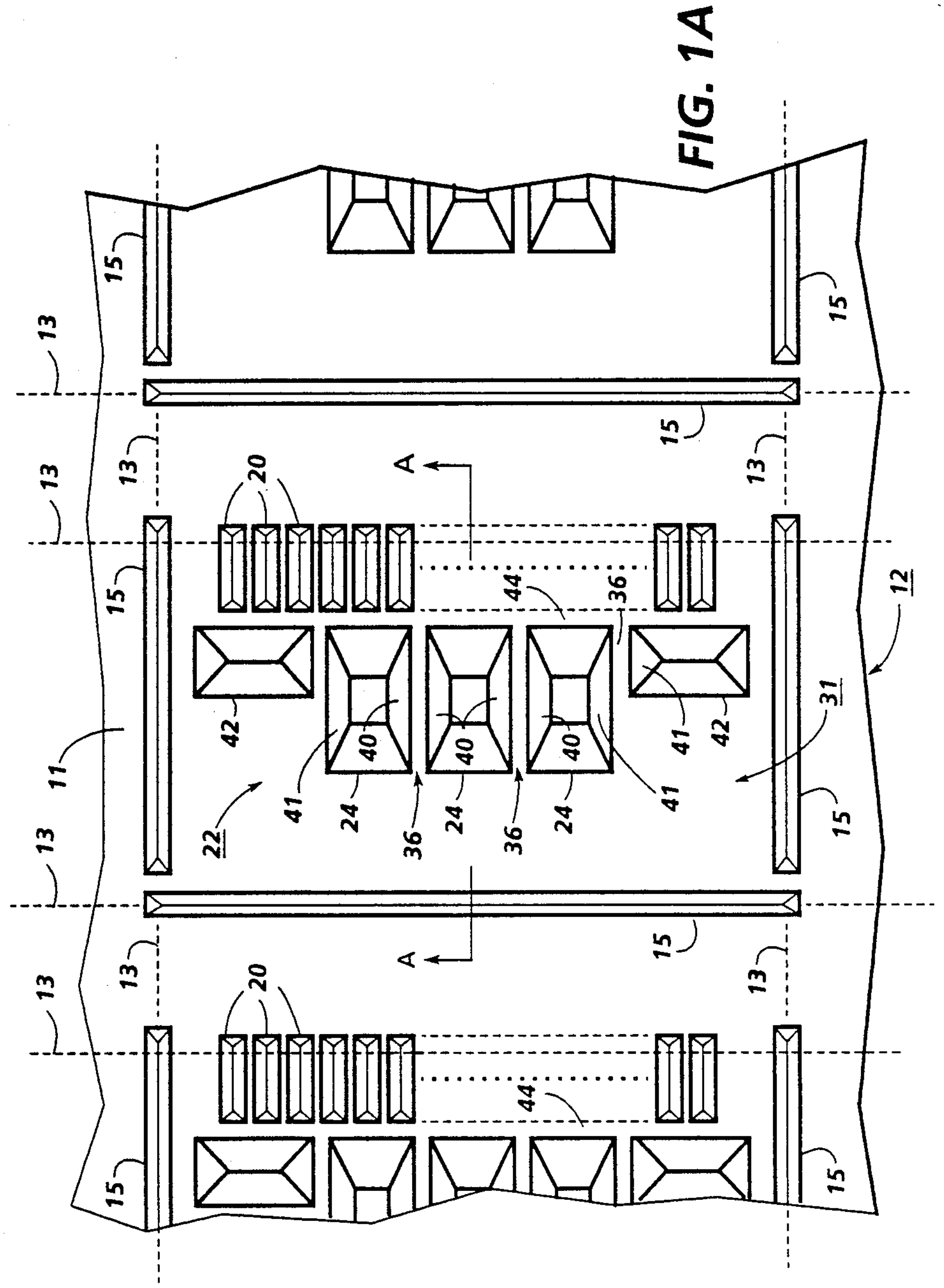
FIG. 1A is an enlarged, partially shown, schematic plan view of an etched channel plate wafer at a time just prior to completion of the anisotropic through etching process.

Referring to FIG. 1A, an enlarged, partially shown, plan view of a patterned and partially anisotropically etched channel plate wafer 12 for large array thermal ink jet printheads 10 is depicted. In a typical large array printhead 10 (See FIG. 4), about 200 ink channels 20 at 300 channels per inch covering the distance of about 1.7 cm are used. In FIG. 1A, only a few channel grooves 20 are shown for clarity and ease of understanding the invention. As discussed later, the (100) wafer 12 is coated with an etch resistant material, such as silicon nitride, and patterned to form a mask 11 having vias therein to expose the wafer surface to an anisotropic etchant. Four sets of vias for each channel plate 31 (that portion of the wafer inside the dicing lines 13) are provided to produce elongated V-grooves 15, channels grooves 20, through recesses 24, and shallow reservoir recesses 42. Elongated V-grooves 15 are formed for providing clearance of the terminals of the addressing electrodes and common return as taught by the above referenced patents. The remainder of the etched recesses are discussed later. Dashed lines 13 delineate the dicing lines for later sectioning into individual printheads 10, after the channel plate and heating element wafers are aligned and bonded together.

With the development of larger arrays, the reservoir was enlarged and caused the etched silicon wafer 12 to be very fragile. Typically, after etching, the wafer must go through a hot phosphoric acid silicon nitride strip, a cool rinse, and then be mechanically aligned and bonded to the heating element wafer. This handling during fabrication caused many of the wafers to fracture, reducing yield. In addition, there is another problem associated with a long, through-etched reservoir. Any misalignment of the via pattern in the mask 11 with the {111} crystal planes is a function of both the angular misorientation and the length "l" of the pattern. For example, the actual width "W" of a rectangular etched recess obtained by anisotropically etching an elongated pattern, when it is misaligned with the {111} crystal plane by an angle $\theta$ degrees, is: $W = l \sin\theta + w \cos\theta$, where "w" is the pattern width. Note that the length "l" is a major component of the width increase caused by the misalignment. This undercutting gets more severe as the array length increases. Since the undercutting is a variable, depending on the pattern-crystal misorientation of a particular wafer, it cannot be easily compensated for in the mask.

Figure 1B:
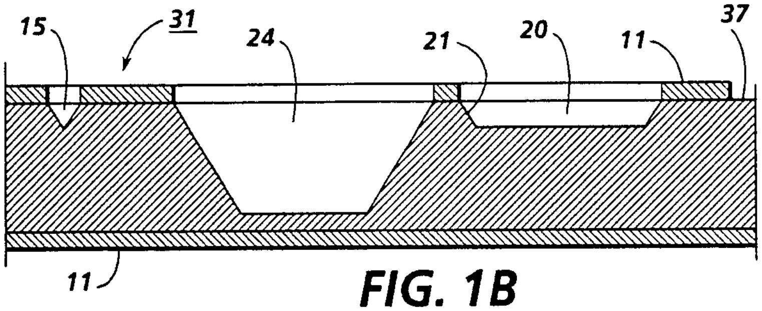
FIG. 1B is a cross sectional view of the wafer of FIG. 1A as viewed along view line A—A showing the incomplete etch of the through recesses of the segmented reservoir.

As disclosed in U.S. Pat. Nos. Re. 32,572 and 4,638,337, the channel plate is formed from a (100) silicon wafer 12 to produce a plurality of upper substrates or channel plates 31 for the printhead 10. After the wafer is chemically cleaned, a pyrolytic CVD silicon nitride layer 11 (see FIG. 1B) is deposited on both sides. Using conventional photolithography, a plurality of vias 24 for through-etched recesses and vias 42 for shallow reservoir recesses that will serve as the ink reservoirs or manifolds, vias 20 for the ink channel recesses, vias 15 for the elongated V-grooves that will provide clearance for the electrode terminals 32 (see FIG. 4), and at least two vias for alignment openings (not shown) at predetermined locations are printed on one wafer side 37. The silicon nitride is plasma etched off of the patterned vias. A potassium hydroxide (KOH) anisotropic etch may be used to etch the recesses. In this case, the resultant {111} etch planes of the (100) wafer make an angle of 54.7 degrees with the surface of the wafer. The reservoirs are equal square or rectangular surface patterns and the alignment openings are both about 60 to 80 mils (1.5 to 2 mm) square. Thus, both are etched entirely through the 20 mil (0.5 mm) thick wafer. FIGS. 1A and 1B show the etched wafer just prior to etch through of the recess 24. At the completion of the etching process, the recesses 24 will etch completely through. The spacing between the vias 24 and 42 are determined to enable complete undercutting simultaneously with the etch through of the wafer. The undercutting provides a flow path for the ink between the through etched recesses and the shallow reservoir recesses. Thus, as discussed later with respect to FIGS. 2 and 3, the shallow reservoirs 42 are internally fed from the larger through etched reservoirs 24. This is enabled because there is a slight normal undercutting of the mask of about 7 micrometers during the time period required to anisotropically etch through a 20 mil thick wafer. Therefore, as long as the spacing between vias is 14 microns or less, there will be a complete undercut. The wafer must then be removed from etchant to prevent total destruction of the dividing walls separating the recesses making up the segmented reservoirs.

Figure 4:
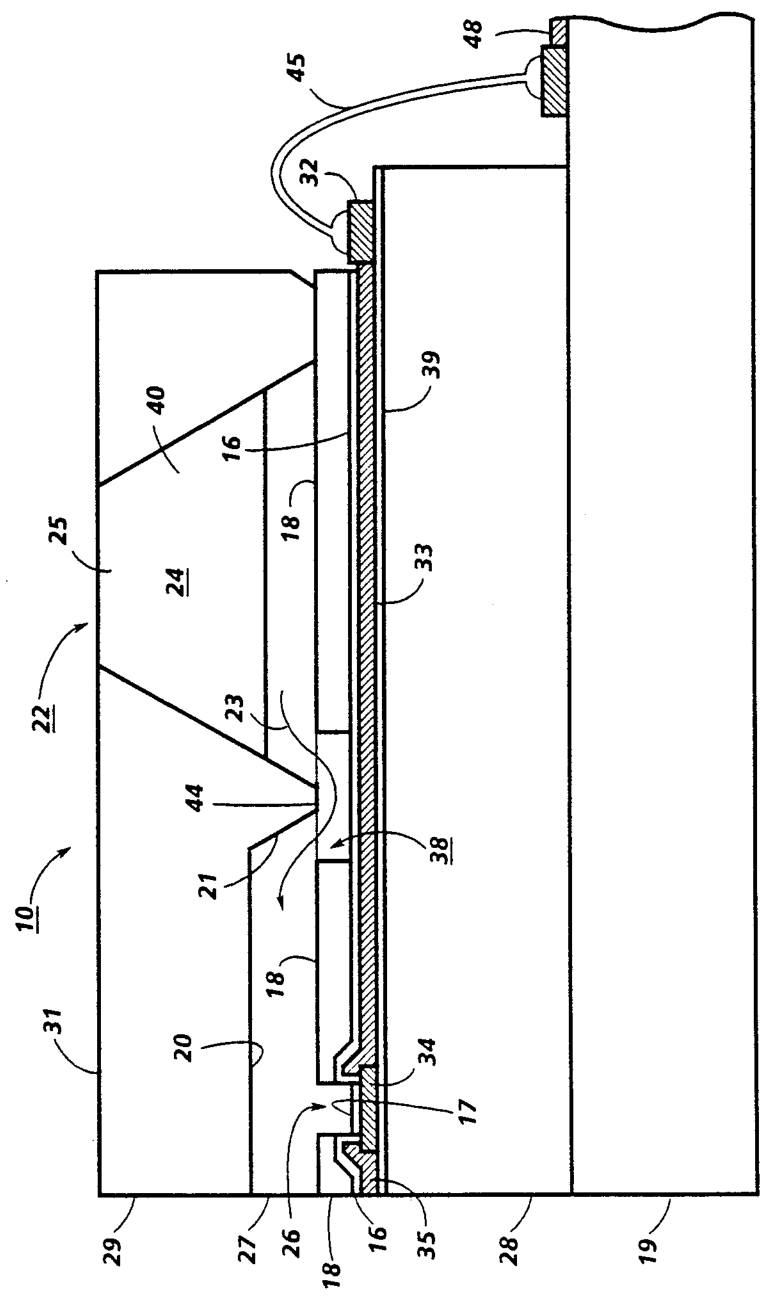
FIG. 4 is an enlarged, schematic cross sectional view of an ink jet printhead of the present invention as viewed along a view line through one of the through recesses of the segmented reservoir.
Figure 5:
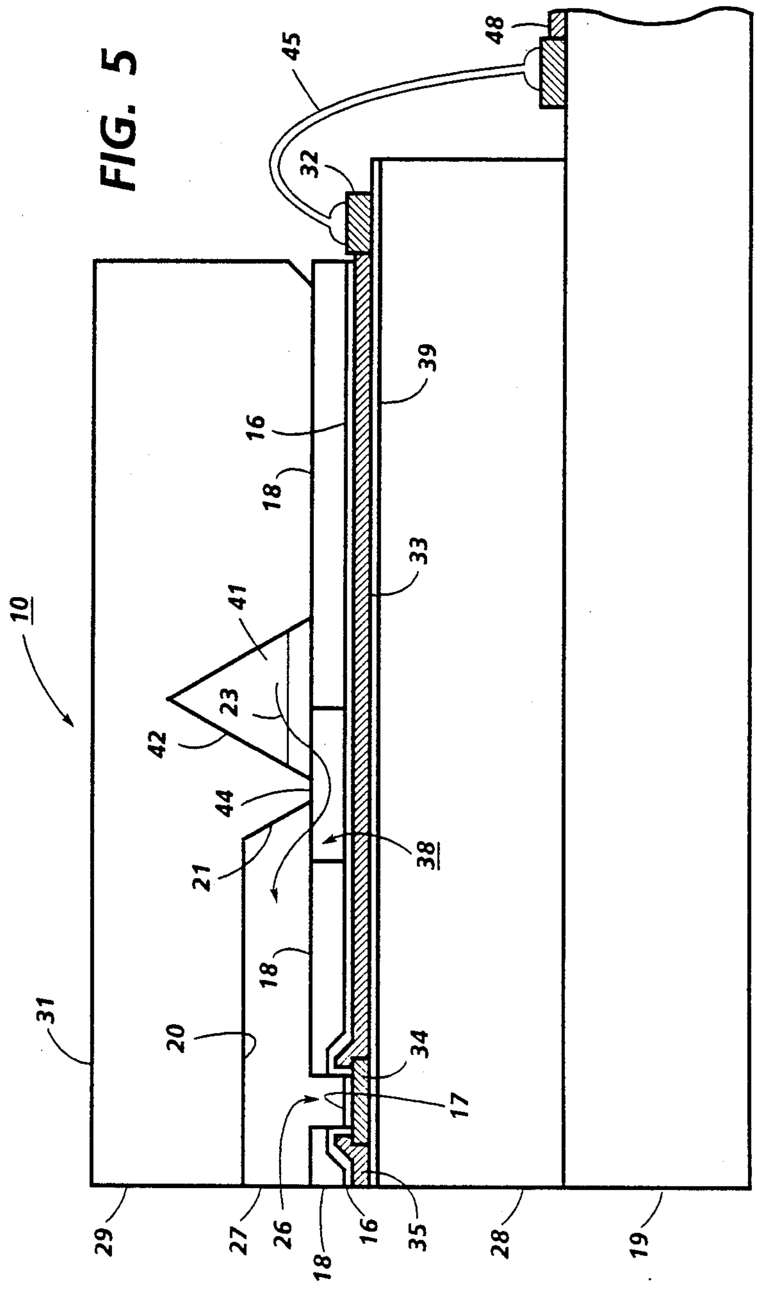
FIG. 5 is similar to FIG. 4 except it is a cross sectional view as viewed along a view line through one of the V-groove recesses of the segmented reservoir.

The surface 37 of the wafer 12 containing the manifolds and channel recesses are portions of the original wafer surface on which adhesive will be applied later for bonding it to the substrate or wafer (not shown) containing the plurality of sets of heating elements. A final dicing cut along dashed cut lines 13 produces end face 29 (see FIG. 4), opens one end of the elongated groove 20 producing nozzles 27. The other ends of the channel groove 20 remain closed by end 21. However, the alignment and bonding of the channel plate to the heater plate places the ends 21 of channels 20 directly over recesses 38 in the thick film insulative layer 18, as shown in FIGS. 4 and 5, enabling the flow of ink into the channels from the segmented reservoir as depicted by arrows 23. The other dicing cuts along dashed dicing lines 13 complete the sectioning of the two bonded wafers into a plurality of individual, large array printheads.

The via patterns which produce the linear series of through-etched recesses 24, the open bottoms 25 of which serve as separate ink inlets, are spaced from each other, so that individual reservoirs are formed that are separated from each other by dividing walls 36. The opposite surfaces 40 of the dividing walls form part of respective adjacent reservoirs. The linear series of reservoirs form a segmented reservoir 22, each segment being either a through-etched recess 24 or an outer shallow reservoir 42. The individual recesses 38 (refer to FIGS. 4 and 5) in the thick film layer 18 provides separate ink flow paths to the adjacent ink channels, as taught by U.S. Pat. No. 4,774,530 and incorporated herein by reference. The segmented reservoir increases the channel plate wafer strength and thus increases the printhead yield over that obtainable with more fragile channel plate wafers which have single reservoirs for large arrays of ink channels. In addition, the smaller series of individual reservoirs which form the segmented reservoir, reduce the effects of angular misalignment between the mask and the channel plate wafer crystal planes and by use of internally fed, shallow reservoirs provide for smaller total ink inlet areas that enable the use of smaller, commercially available gaskets to seal the printheads to external ink supplies (not shown).

Figure 3:
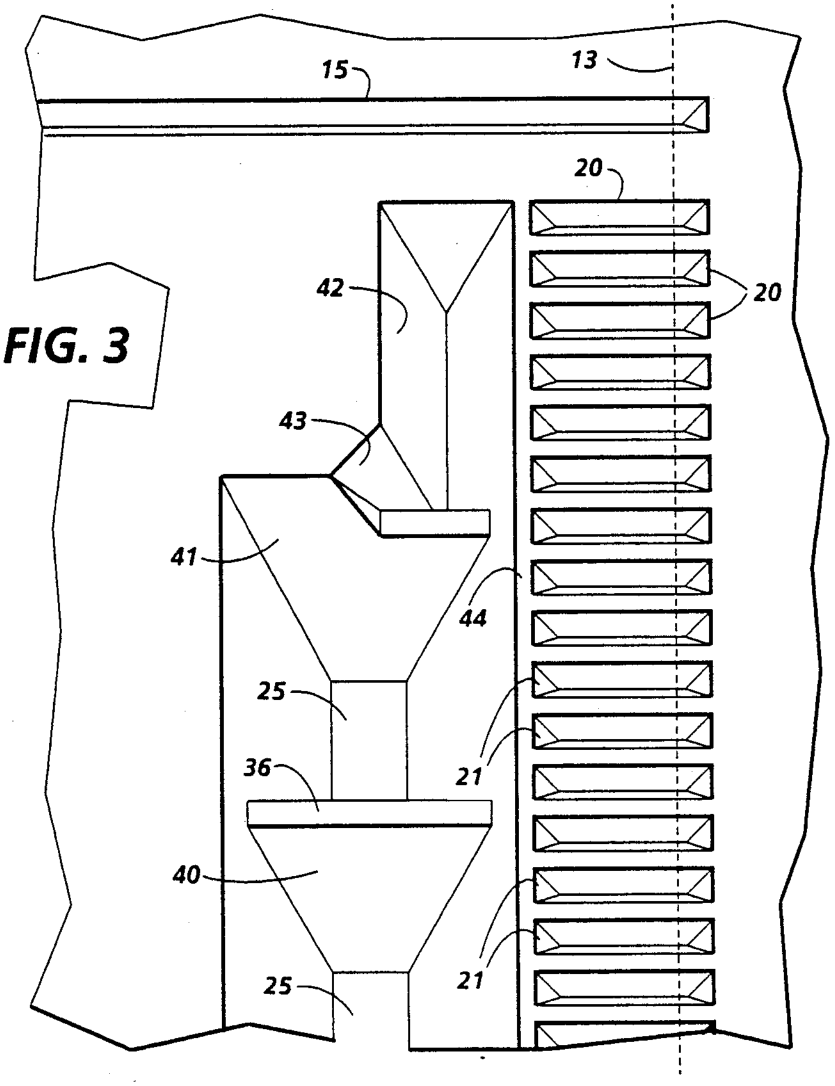
FIG. 3 is an enlarged view of the end of the segmented reservoir, showing the etch shortened dividing wall between a through etched recess and V-groove of the segmented reservoir, so that the V-groove portion may be internally fed.
Figure 2:
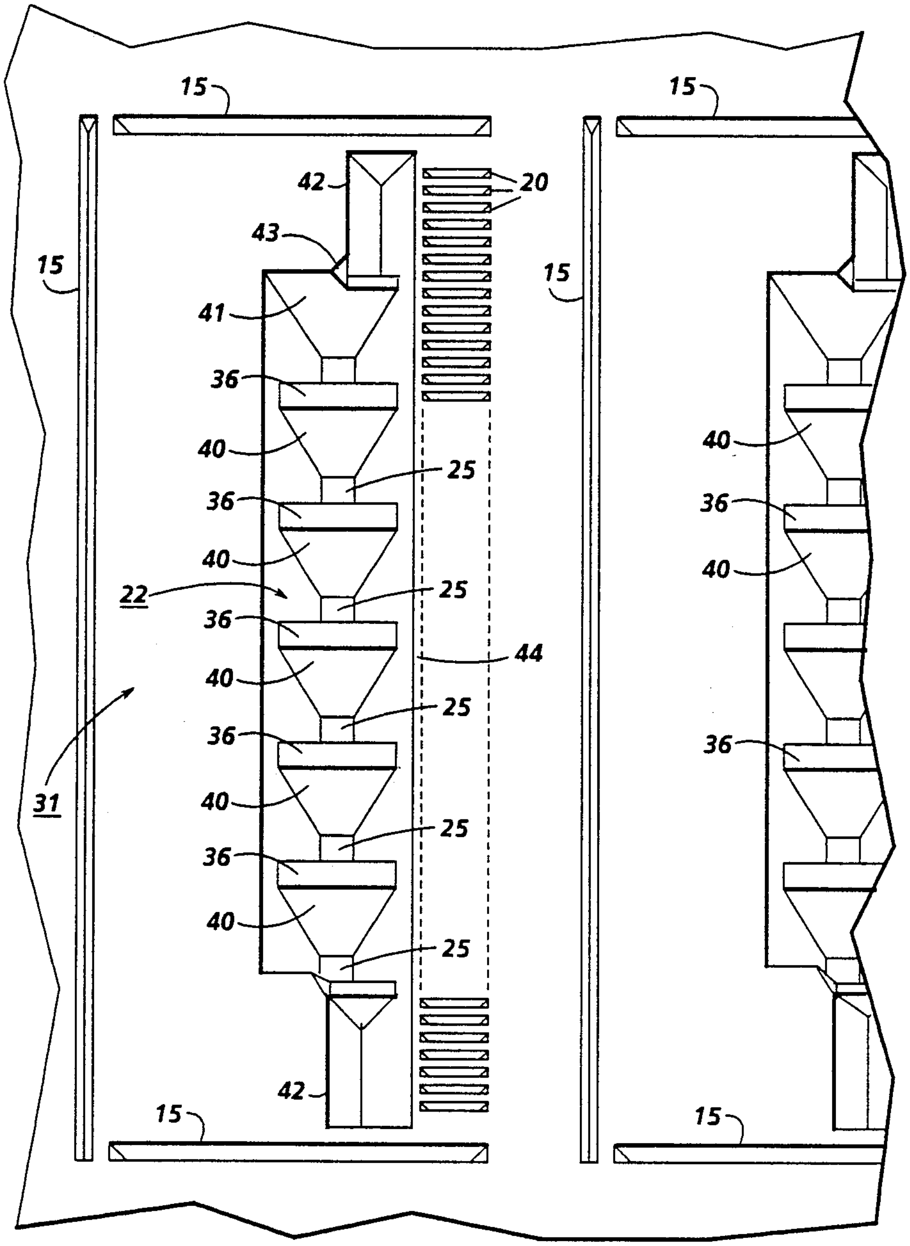
FIG. 2 is an enlarged, isometric view of the channel plate wafer of FIG. 1A after the etching process has been completed and the mask removed, showing the shortened dividing walls that enable cross flow of ink between through recesses and V-grooves according to the present invention.

Referring to FIGS. 2 and 3, the schematic plan view of the wafer portion shown in FIG. 1A is shown in isometric view after the etching process has been completed and with the mask removed. FIG. 3 is an enlarged view of an end portion of the segmented reservoir 22 having the shallow, V-groove shaped reservoir recess 42 and shows the dividing walls 40, 41 reduced in height because of the mask undercutting. The shortened dividing walls still provide the added strength required to improve printhead yield and also provide the ink flow paths to enable internally fed shallow end portions of the segmented reservoir.

Thus, in the preferred embodiment of the invention, a large array channel plate 31 has a linear series of vias which are sized to anisotropically etch through a 20 mil thick wafer and at least one outer via on opposing ends which is designed to form a shallow, V-groove recess and not etch through. Each of these vias are spaced less than 14 micrometers apart, so that near the end of the etching process, the mask will completely undercut. The wafer is removed from the etchant to stop the etching before the dividing walls are shortened too much or are totally etched away. Since the shallow reservoir recess 42 is not as wide as the adjacent through etch recess 24, the undercut wall 41 exposes more non {111} crystal plane surface, so that notched corners 43 are produced.

This configuration for a segmented reservoir to supply ink to the channels 20 not only provides several strengthening ribs or shortened strengthening dividing walls 36, but provides a smaller number of linear inlets 25 which allows the use of standard oval gaskets (not shown) for sealing the printhead to an external ink supply (not shown), such as, for example, a disposable ink cartridge or flexible hose interconnector (neither shown). The shortened dividing walls or ribs 36 provide communication or ink flow paths throughout the entire length of the segmented reservoir 22. The spacing 44 between the ink channels 20 and the segmented reservoir 22 is large enough to prevent complete undercutting, so that the recess 38 in the thick film layer 18 is used to supply and replenish the ink in the channels as the ink droplets are expelled from the channel nozzles 27 (see FIGS. 4 and 5).

An enlarged, schematic cross sectional view of an ink jet printhead 10 of the present invention is shown in FIGS. 4 and 5. The printhead shown in FIG. 4 is a cross sectional view taken through a through-etched reservoir segment 24, while the printhead of FIG. 5 is taken through the shallow reservoir recess 42. These Figures show the front face 29 of the printhead 10 and droplet emitting nozzle 27 penetrating therethrough. The lower electrically insulating substrate or heating element plate 28 has the heating elements 34 and addressing electrodes 33 patterned on surface 30 thereof, while the upper substrate or channel plate 31 has parallel grooves 20 which extend in one direction and penetrate through the upper substrate front face edge 29. The other end of grooves terminate at slanted wall 21. The through recesses 24, which are used as the ink supply manifold or reservoir for the capillary filled ink channels 20, has an open bottom 25 for use an an ink fill holes or inlets. The surface of the channel plate with the various grooves and recesses are aligned and bonded to the heater plate 28, so that a respective one of the plurality of heating elements 34 is positioned in each channel, formed by the grooves and the lower substrate or heater plate. Ink enters the manifold formed by the recess 24 and the lower substrate 28 through the inlets 25 and, by capillary action, fills the associated channels 20 by flowing through one or more recesses 38 formed in the thick film insulative layer 18. The ink at each nozzle forms a meniscus, the surface tension of which, in combination with a slightly negative ink supply pressure, prevents the ink from weeping therefrom. The addressing electrodes 33 on the lower substrate or channel plate 28 terminate at terminals 32. The upper substrate or channel plate 31 is smaller than that of the lower substrate in order that the electrode terminals 32 are exposed and available for placement of wire bonds 45 to the electrodes 48 on the daughter board 19, on which the printhead 10 is permanently mounted. Layer 18 is a thick film passivation layer, discussed later, sandwiched between upper and lower substrates. This layer is etched to expose the heating elements, thus placing them in a pit 26, and is etched to form a recess to enable ink flow between the segmented reservoir 22 and the associated ink channels 20. In addition, the thick film insulative layer is etched to expose the electrode terminals.

FIGS. 4 and 5 show how the ink flows from the through etched reservoir segment 24 and around the end 21 of the groove 20 as depicted by arrow 23. As is disclosed in U.S. Pat. No. 4,638,337 to Torpey et al, a plurality of sets of bubble generating heating elements 34 and their addressing electrodes 33 are patterned on the polished surface of a single side polished (100) silicon wafer. Prior to patterning, the multiple sets of printhead electrodes 33, the resistive material that serves as the heating elements, and the common return 35, the polished surface of the wafer is coated with an underglaze layer 39 such as silicon dioxide, having a thickness of about 2 micrometers. The resistive material may be a doped polycrystalline silicon which may be deposited by chemical vapor deposition (CVD) or any other well known resistive material such as zirconium boride ($ZrB_2$). The common return and the addressing electrodes are typically aluminum leads deposited on the underglaze and over the edges of the heating elements. The common return ends or terminals 37 and addressing electrode terminals 32 are positioned at predetermined locations to allow clearance for wire bonding 45 to the electrodes 48 of the daughter board 19, after the channel plate 31 is attached to make a printhead. The common return 35 and the addressing electrodes 33 are deposited to a thickness of 0.5 to 3 micrometers, with the preferred thickness being 1.5 micrometers.

In the preferred embodiment, polysilicon heating elements are used and a silicon dioxide thermal oxide layer 17 is grown from the polysilicon in high temperature steam. The thermal oxide layer is typically grown to a thickness of 0.5 to 1 micrometer to protect and insulate the heating elements from the conductive ink. The thermal oxide is removed at the edges of the polysilicon heating elements for attachment of the addressing electrodes and common return, which are then patterned and deposited. If a resistive material such as zirconium boride is used for the heating elements, then other suitable well known insulative materials may be used for the protective layer thereover. Before electrode passivation, a tantalum (Ta) layer (not shown) may be optionally deposited to a thickness of about 1 micrometer on the heating element protective layer 17 for added protection thereof against the cavitational forces generated by the collapsing ink vapor bubbles during printhead operation. The tantalum layer is etched off all but the protective layer 17 directly over the heating elements using, for example, $CF_4/O_2$ plasma etching. For electrode passivation, a two micrometer thick phosphorous doped CVD silicon dioxide film 16 is deposited over the entire wafer surface, including the plurality of sets of heating elements and addressing electrodes. The passivation film 16 provides an ion barrier which will protect the exposed electrodes from the ink. Other ion barriers may be used, such as, for example, polyimide, plasma nitride, as well as the above-mentioned phosphorous doped silicon dioxide, or any combinations thereof. An effective ion barrier layer is achieved when its thickness is between 1000 angstrom and 10 micrometers, with the preferred thickness being 1 micrometers. The passivation film or layer 16 is etched off of the terminal ends of the common return and addressing electrodes for wire bonding later with the daughter board electrodes. This etching of the silicon dioxide film may be by either the wet or dry etching method. Alternatively, the electrode passivation may be accomplished by plasma deposited silicon nitrite (Si3N4).

Next, a thick film type insulative layer 18 such as, for example, Riston ®, Vacrel ®, Probimer 52 ®, or polyimide, is formed on the passivation layer 16 having a thickness of between 10 and 100 micrometers and preferably in the range of 25 to 50 micrometers. The insulative layer 18 is photolithographically processed to enable etching and removal of those portions of the layer 18 over each heating element (forming recesses or pits 26), the linear series of recesses 38 for providing ink passage from the manifold 24 to the ink channels 20 associated with each reservoir 24 and inlet 25, and over each electrode terminal 32, 37. The recesses 38 are formed by the removal of these portions of the thick film layer 18. Thus, the passivation layer 16 alone protects the electrodes 33 from exposure to the ink in these recesses 38.

In any alternate embodiment, not shown, the shallow, V-groove recesses 42 are placed into communication with the rest of the segmented reservoir 22 by etching additional recesses in the thick film insulative layer 18 between the shallow, V-groove recesses and the adjacent through etched portions of the segmented reservoir 22, instead of providing for complete undercutting of wall 41 which separates the shallow, V-groove recess 42 from adjacent through recess 24 of the segmented reservoir 22. This enables the production of a thicker, stronger wall 41 and eliminates the notched corners 43, as shown in FIGS. 2 and 3. This alternate embodiment provides for even stronger etched channel plates while still reducing the effects of mask to crystal plane misalignment and reducing the length of the array of inlets 25, so that small gaskets can be used between the printhead and their ink supplies.

In summary, this invention reduces the effects of angular misalignment between mask and wafer crystal planes by segmenting the large reservoirs with dividing walls. This concurrently provides a strengthened wafer which increases manufacturing yield. By reducing the size of the opposing outermost segmented reservoir portions to prevent etch through and by spacing the vias a distance of less than 14 micrometers apart to enable complete undercut just prior to wafer etch through, the dividing walls are shortened to provide internally fed and ink cross-mixing. A large array of nozzles are thus connected to an external ink supply by a shorter ink inlet array. The shorter inlet array enables the use of a smaller, standard gasket to seal the printhead to the external ink supply.

Many modifications and variations are apparent from the foregoing description of the invention, and all such modifications and variations are intended to be within the scope of the present invention.

I claim:

1. An improved thermal ink jet printhead of the type formed by the mating and bonding of first and second substrates, the first substrate being silicon and having anisotropically etched in one surface thereof a through recess and a plurality of parallel, elongated grooves, the second substrate having a plurality of heating elements and addressing electrodes patterned on one surface thereof, the through recess serving as an ink reservoir with its open bottom serving as an ink inlet and the elongated grooves serving as ink channels, one end of which is open to serve as ink droplet emitting nozzles, each heating element being located in a respective one of the ink channel grooves a predetermined distance upstream from the nozzles, and said printhead having means to place the ink channel grooves into communication with the through recess, so that selective application of electrical pulses representing digitized data to the heating elements eject and propel ink droplets from the nozzles to a recording medium, wherein the improvement comprises:

said ink reservoir being produced by patterning vias in an etch resistant mask on a surface of the first substrate and anisotropically etching for a predetermined time period the first substrate to provide a linear series of individual through recesses and at least one outer shallow, V-groove recess on each of the outer ends of the series of through recesses, so that the ink reservoir is segmented; and means for placing the through recesses and V-groove recesses into communication with each other, so that the V-groove recesses are internally fed from the through recesses of the segmented reservoir.

2. The improved printhead of claim 1, wherein the means for placing the segmented reservoir into communication with the ink channels is a patterned thick film insulative layer sandwiched between the first and second substrates; and wherein the means for placing the through recesses into communication with each other is having a predetermined spacing between vias which produces the segmented reservoir which will allow complete undercutting prior to completion of the etching time period, so that said undercutting provides ink flow paths between through recesses and the shallow outer V-groove recesses, so that the V-groove recesses are internally fed.

3. The improved printhead of claim 2, wherein the shallow outer V-grooves may be internally fed by recesses in the thick film insulative layer instead of ink flow paths produced by mask undercutting.

4. An improved thermal ink jet printhead of the type formed by the mating and bonding of first and second substrates, the first substrate being silicon and having anisotropically etched in one surface thereof a through recess and a plurality of parallel, elongated grooves, the second substrate having a plurality of heating elements and addressing electrodes patterned on one surface thereof, the through recess serving as an ink reservoir with its open bottom serving as an ink inlet and the elongated grooves serving as ink channels, one end of which is open to serve as ink droplet emitting nozzles, each heating element being located in a respective one of the ink channel grooves a predetermined distance upstream from the nozzles, and said printhead having means to place the ink channel grooves into communication with the through recess, so that selective application of electrical pulses representing digitized data to the heating elements eject and propel ink droplets from the nozzles to a recording medium, wherein the improvement comprises:

said ink reservoir being segmented by dividing walls to provide a segmented reservoir, the segmented reservoir being produced by patterning vias in an etch resistant mask on a surface of the first substrate and anisotropically etching the first substrate to produce a linear series of separate through recesses, together with at least one shallow, V-groove recess on each of the opposing outer ends of the series of through recesses during a predetermined etching time period, opposing wall surfaces of each dividing wall being in separate adjacent recesses, the spacing between vias which will produce the segmented reservoir having a predetermined dimension to enable complete undercutting prior to completion of the etching time period, so that said undercutting provides ink flow paths between through recesses as well as internally feeding ink to the shallow outer V-groove recesses, the shallow recesses reducing the number of through recesses, so that smaller gaskets may be used to seal the printhead to an external ink supply, while the dividing walls strengthen the first substrate and reduce the effects of angular misalignment between mask and first substrate crystal planes.

5. The improved printhead of claim 4, wherein via spacing between the through recesses and the shallow, V-groove recesses is large enough to prevent undercutting, and wherein the printhead further comprises:

a patterned thick film insulative layer sandwiched between the first and second substrates containing recesses therein to expose the heating elements and electrode terminals and to provide at least one recess for enabling the passage of ink from the segmented reservoir to the ink channels, the patterned thick film layer further having recesses to provide communication between the shallow, V-grooves and the through recesses of the segmented reservoir.

* * * * *